(12) United States Patent
Hecht

(10) Patent No.: US 8,596,937 B2
(45) Date of Patent: Dec. 3, 2013

(54) ROTARY CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 811 days.

(21) Appl. No.: 12/765,579

(22) Filed: Apr. 22, 2010

(65) Prior Publication Data
US 2010/0272533 A1 Oct. 28, 2010

(30) Foreign Application Priority Data

Apr. 26, 2009 (IL) .......................................... 198378

(51) Int. Cl.
*B23D 77/04* (2006.01)

(52) U.S. Cl.
USPC ........ 408/153; 408/233; 408/170; 408/239 R; 279/8

(58) Field of Classification Search
USPC ...... 408/231, 232, 239 A, 239 R, 59, 57, 238, 408/153, 168, 169, 170, 171, 199, 233; 279/8; 409/232, 234
See application file for complete search history.

(56) References Cited

U.S. PATENT DOCUMENTS

| | | | | | |
|---|---|---|---|---|---|
| 789,866 | A | * | 5/1905 | Miller | 408/233 |
| 906,656 | A | * | 12/1908 | Peck | 408/233 |
| 1,082,553 | A | * | 12/1913 | Pohlman | 408/163 |
| 1,107,304 | A | * | 8/1914 | Herman | 408/168 |
| 1,408,706 | A | * | 3/1922 | Long | 408/170 |
| 1,446,467 | A | * | 2/1923 | Johnson | 408/164 |
| 1,525,459 | A | * | 2/1925 | Martell | 408/170 |
| 1,621,227 | A | * | 3/1927 | Wetmore | 279/16 |
| 1,960,319 | A | * | 5/1934 | Severson | 408/169 |
| 1,994,792 | A | * | 3/1935 | Sanderson | 175/414 |
| 2,284,768 | A | * | 6/1942 | Ramsdell | 408/156 |
| 2,638,020 | A | * | 5/1953 | Fishwick | 408/166 |
| 3,640,637 | A | | 2/1972 | Merz | |

(Continued)

FOREIGN PATENT DOCUMENTS

| | | |
|---|---|---|
| CN | 101678485 | 3/2010 |
| DE | 195 11 257 | 10/1995 |
| DE | 19511257 | 10/1995 |
| JP | 2009-45722 | 3/2009 |

OTHER PUBLICATIONS

International Search Report in PCT/IL2010/000300, dated Jul. 16, 2010.
Official Action dated May 29, 2013 issued in Chinese counterpart application (No. 201080018245.7).
Search Report dated May 29, 2013 issued in Chinese counterpart application (No. 201080018245.7).

*Primary Examiner* — Eric A Gates
*Assistant Examiner* — Paul M Janeski
(74) *Attorney, Agent, or Firm* — Womble Carlyle

(57) ABSTRACT

A rotary cutting tool for reaming operations, including a generally cylindrically shaped tool shank with a longitudinal axis having a plurality of radially protruding and generally axially extending clamping wings, and a cylindrically shaped cutting head having a central bore and a plurality of axially extending cutting edges with an outer cutting diameter. The central bore has a plurality of circumferentially and alternately spaced bore sectors and bore recesses, where each bore sector has an outwardly inclined female clamping surface in clamping contact with an outwardly inclined male clamping surface of each clamping wing. A cylindrical shaped locking sleeve and a cylindrical shaped clamping nut assembled to the tool shank provide a means to adjust the clamping contact forces and the cutting diameter of the cutting head, and also enable removal and replacement of the cutting head without removal of the locking sleeve and clamping nut.

16 Claims, 6 Drawing Sheets

(56) References Cited

U.S. PATENT DOCUMENTS

| | | | |
|---|---|---|---|
| 3,764,224 A * | 10/1973 | Merz | 408/231 |
| 4,705,435 A | 11/1987 | Christoffel | |
| 4,998,851 A * | 3/1991 | Hunt | 408/143 |
| 5,163,790 A | 11/1992 | Vig | |
| 7,004,692 B2 | 2/2006 | Hecht | |
| 7,775,751 B2 * | 8/2010 | Hecht et al. | 408/57 |
| 2004/0022594 A1 | 2/2004 | Hecht | |
| 2010/0061820 A1 * | 3/2010 | Haimer | 408/143 |

* cited by examiner

ROTARY CUTTING TOOL

FIELD OF THE INVENTION

The present invention relates to a rotary cutting tool for use in metal cutting processes in general, and for reaming operations in particular.

BACKGROUND OF THE INVENTION

Within the field of rotary cutting tools for reaming operations of a metal workpiece, the rotary cutting tools may be configured in many different ways.

U.S. Pat. No. 4,705,435 discloses an adjustable reamer with a cutter head integral to the shank with coolant outlet channels directing coolant fluid to the leading edges. A conical head of a conical screw engaged within the threaded shank expands the cutter head.

U.S. Pat. No. 5,163,790 discloses an adjustable reamer with an interchangeable cutting head and a coolant feed supplying the cutter head from outside nozzles, having a clamping bolt with a conical head screwed into the reamer shank securing and expanding the cutting head.

U.S. Pat. No. 7,004,692 discloses a reamer having a tool shank, a screw member remaining within the tool shank during normal operations, and a replaceable cutting head having a fixed cutting diameter. Coolant channels within the screw member direct coolant fluid to the cutting edges of the cutting head.

SUMMARY OF THE INVENTION

In accordance with the present invention, there is provided a rotary cutting tool comprising a tool shank, a cutting head, a locking sleeve and a clamping nut:

the tool shank comprising a longitudinal axis extending in a forward to rearward direction having a cutting head receiving portion adjacent a tool shank forward end surface and a male threaded portion rearward of the cutting head receiving portion, the cutting head receiving portion comprising a plurality of radially protruding and generally axially extending clamping wings, each clamping wing having a male clamping surface outwardly inclined in the forward direction;

the cutting head comprising a central bore having a central bore axis coaxial with the longitudinal axis and a peripheral outer surface having a plurality of cutting edges, with an outer cutting diameter, axially extending between a cutting head rearward end surface and a cutting head forward end surface, the central bore comprising a plurality of generally axially extending bore sectors, each bore sector having a female clamping surface outwardly inclined in a direction towards the cutting head forward end surface;

the locking sleeve having a cylindrical shape with a through bore between a locking sleeve rearward end surface and a locking sleeve forward end surface; and the clamping nut having a threaded bore between a clamping nut forward and rearward end surface, wherein the threaded bore of the clamping nut is in threaded engagement with the male threaded portion of the tool shank, the locking sleeve rearward end surface is in clamping contact with the clamping nut forward end surface, the locking sleeve forward end surface is in clamping contact with the cutting head rearward end surface, and the plurality of female clamping surfaces are in clamping contact with the plurality of male clamping surfaces, and wherein the clamping contact forces and the cutting diameter can be increased and decreased by adjusting the rotational position of the clamping nut, and the cutting head can be removed and replaced following rotation of the clamping nut without removing either the locking sleeve or the clamping nut from the tool shank.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
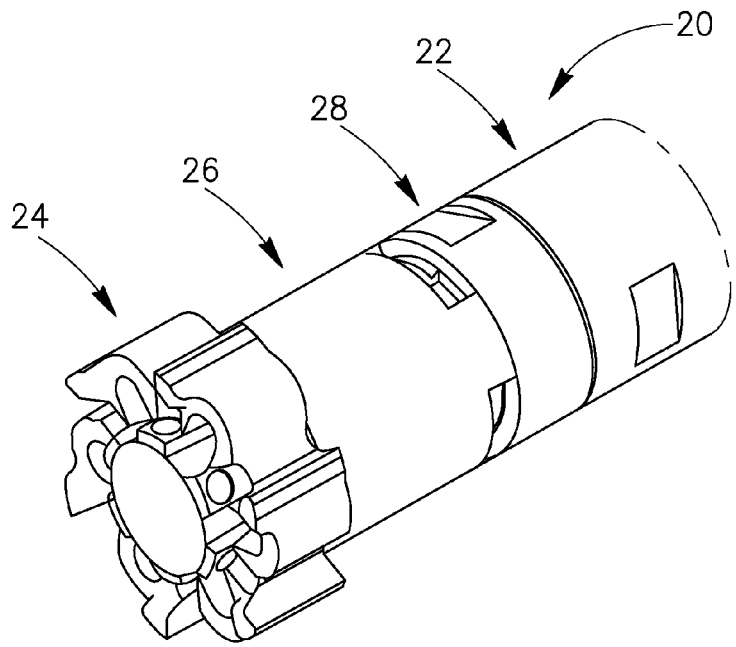
FIG. 1 is a perspective view of a rotary cutting tool in accordance with the present invention.
Figure 2:
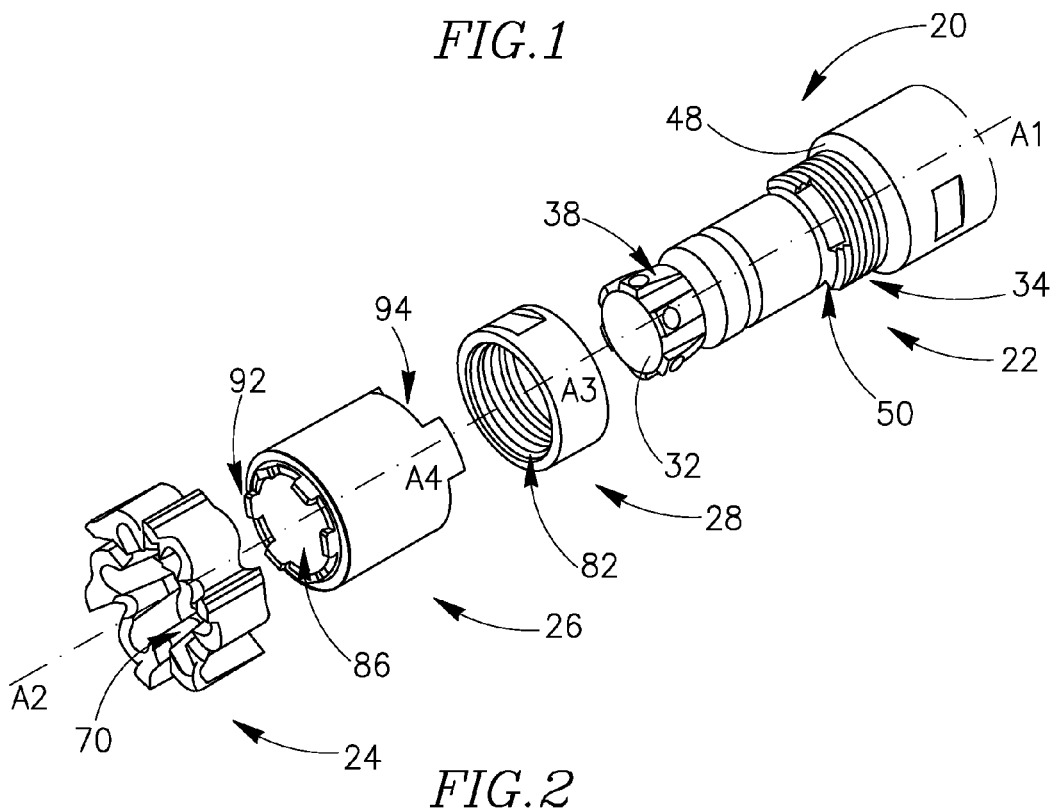
FIG. 2 is an exploded perspective view of the rotary cutting tool shown in FIG. 1.

Attention is first drawn to FIGS. 1 and 2, showing a rotary cutting tool 20 in accordance with the present invention. The rotary cutting tool 20 is in the form of an expandable reamer including a tool shank 22, a cutting head 24, a locking sleeve 26 and a clamping nut 28. The tool shank 22, locking sleeve 26 and clamping nut 28 are typically manufactured from machined steel, and the cutting head 24 of the present invention may be manufactured by form pressing and sintering a carbide powder such as Tungsten Carbide.

Figure 3:
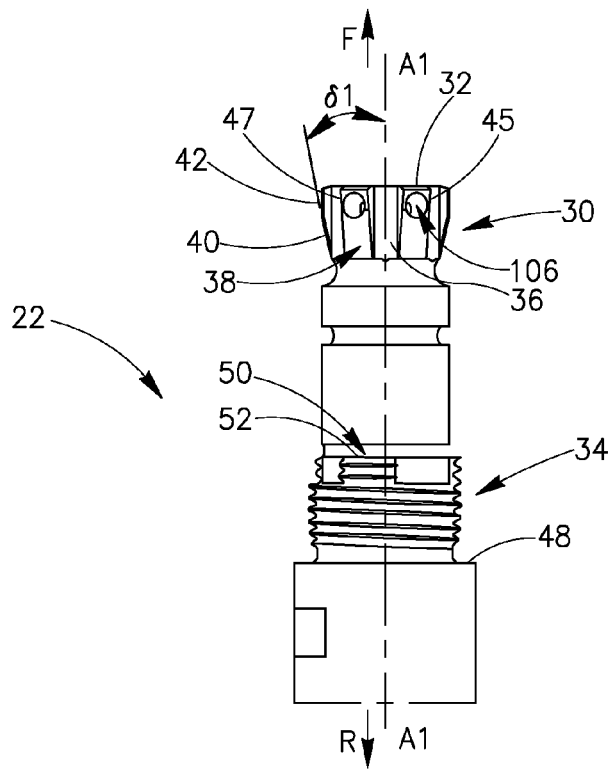
FIG. 3 is a longitudinal side view of a tool shank in accordance with the present invention.
Figure 4:
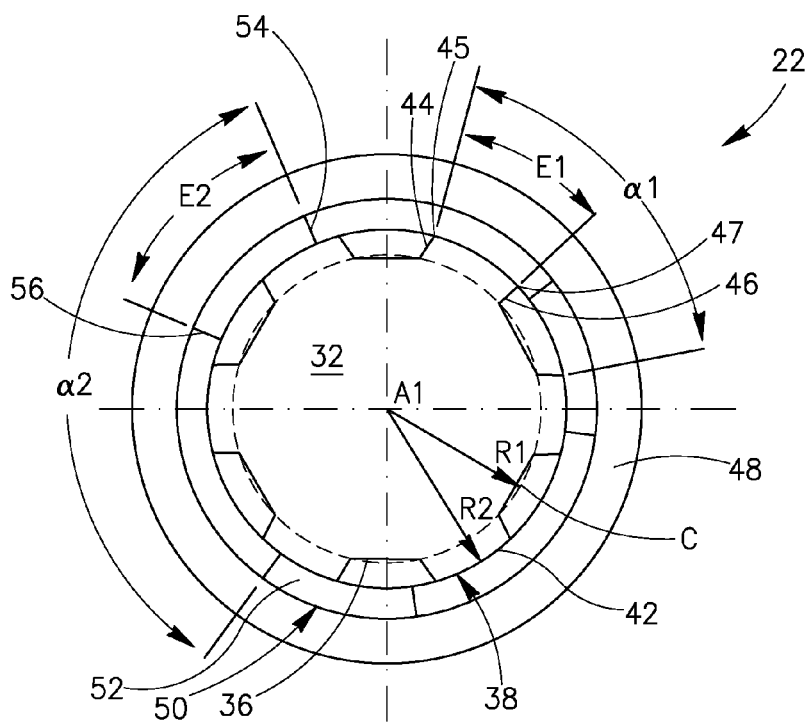
FIG. 4 is a forward end view of the tool shank shown in FIG. 3.

The tool shank 22, as shown FIGS. 3 and 4, is generally cylindrically shaped with a longitudinal axis A1 extending in a forward to rearward direction F, R, having a cutting head receiving portion 30 adjacent a tool shank forward end surface 32 and a male threaded portion 34 rearward of the cutting head receiving portion 30.

The cutting head receiving portion 30 has six generally planar cutting head receiving surfaces 36 circumferentially equally spaced about the longitudinal axis A1 alternating with six radially protruding and generally axially extending clamping wings 38 circumferentially equally spaced about the longitudinal axis A1, where an imaginary circle C circumscribed in a plane perpendicular to the longitudinal axis A1 through twelve lines of intersection between the six cutting head receiving surfaces 36 and the six clamping wings 38 has a receiving surface first radius R1. In some embodiments of the present invention, the six cutting head receiving surfaces 36 may be parallel to the longitudinal axis A1. Each clamping wing 38 has a male clamping surface 40 outwardly inclined in the forward direction F intersecting a partially cylindrical outer wing surface 42 adjacent the shank forward end surface 32 with a clamping wing second radius R2. The male clamping surface 40 forms an acute internal first inclination angle δ1 with the longitudinal axis A1.

It should be appreciated that throughout the detailed description and claims, an 'internal angle' refers to an angle between two features as measured internally, whereas an 'external angle' refers to an angle between two features as measured externally.

The six clamping wings 38 have a clamping wing first pitch angle α1 equal to 60°, where each clamping wing 38 includes circumferentially delimiting leading and trailing wing surfaces 44, 46 transverse to the adjacent outer wing surface 42 having a clamping wing first angular extent E1 between a first wing edge 45 and a second wing edge 47. The first wing edge 45 is formed at the intersection of the leading wing surface 44 and the outer wing surface 42, and the second wing edge 47 is formed at the intersection of the trailing wing surface 46 and the outer wing surface 42. The terms "leading surfaces" and "trailing surfaces" are used to indicate counter-clockwise rotation of the tool shank 22 during operation of the rotary cutting tool 20 when viewed in the direction of the tool shank forward end surface 32.

For other embodiments of the present invention, the "leading surfaces" and the "trailing surfaces" may be reversed to indicate clockwise rotation of the tool shank 22 during operation of the rotary cutting tool 20 when viewed in the direction of the tool shank forward end surface 32, where for these embodiments the direction of rotation of other elements of the rotary cutting tool 20 are correspondingly reversed.

The male threaded portion 34 rearward of the cutting head receiving portion 30 extends in the forward direction F from an annular base surface 48 and includes three axially extending locking protrusions 50 further extending in the forward direction F, each locking protrusion 50 having a forward locking protrusion surface 52. The three locking protrusions 50 are circumferentially equally spaced with a locking protrusion second pitch angle α2 equal to 120°, where each locking protrusion 50 includes radially extending and circumferentially delimiting first and second locking protrusion surfaces 54, 56 having a locking protrusion second angular extent E2.

Figure 5:
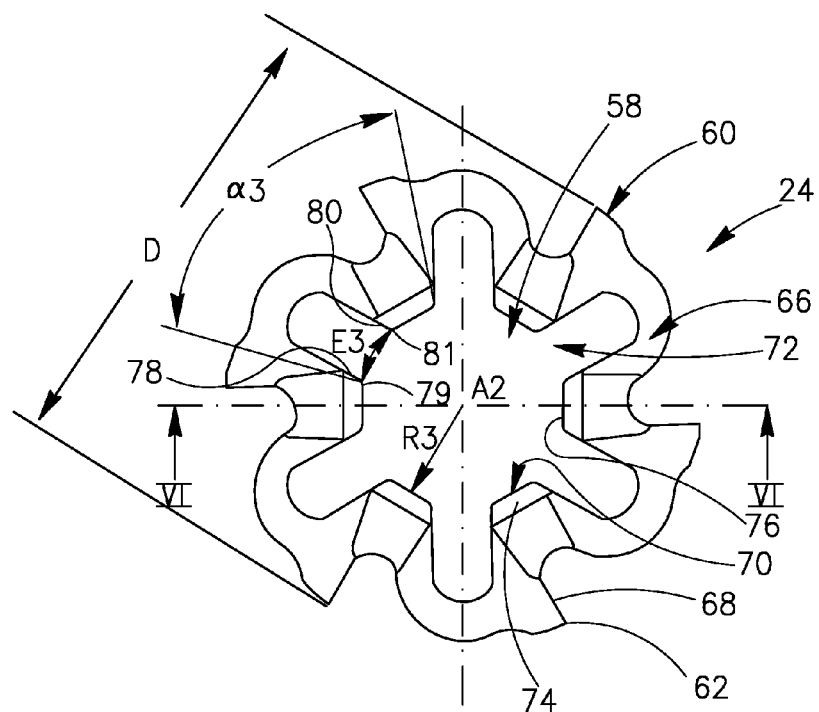
FIG. 5 is a forward end view of a cutting head in accordance with the present invention.
Figure 6:
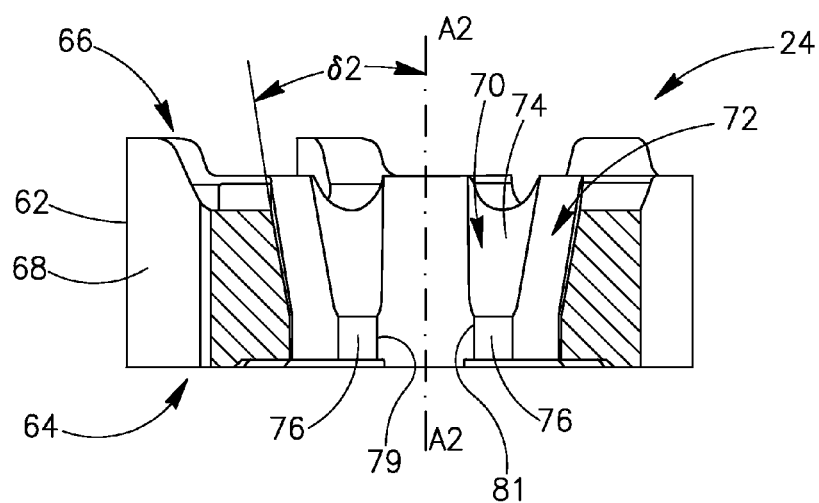
FIG. 6 is a cross-sectional view of the cutting head shown in FIG. 5 taken along the line VI-VI.

The cutting head 24, as shown in FIGS. 5 and 6, has a central bore 58 and a peripheral outer surface 60 including six cutting edges 62 extending axially between a cutting head rearward end surface 64 and a cutting head forward end surface 66 having an outer cutting diameter D. Each cutting edge 62 has an adjacent rake surface 68 transverse to the peripheral outer surface 60 and generally facing in a counter-clockwise direction when viewed in the direction of the cutting head forward surface 66.

The central bore 58 has six circumferentially equally spaced and generally axially extending bore sectors 70 alternating with six circumferentially equally spaced and axially extending bore recesses 72, the bore sectors 70 and bore recesses 72 each having a bore recess third pitch angle α3 equal to the clamping wing first pitch angle α1; 60°. Each bore sector 70 has a female clamping surface 74 outwardly inclined in a direction towards the cutting head forward end surface 66 intersecting an axially extending bore sector surface 76 adjacent the cutting head rearward end surface 64 with a bore sector third radius R3. The female clamping surface 74 forms an acute external second inclination angle δ2 with a central bore axis A2. Each bore recess 72 includes circumferentially delimiting first and second bore recess surfaces 78, 80 transverse to the adjacent bore sector surface 76 having a bore recess third angular extent E3 between a first bore recess edge 79 and a second bore recess edge 81. The first bore recess edge 79 is formed at the intersection of the first bore recess surface 78 and its adjacent bore sector surface 76, and the second bore recess edge 81 is formed at the intersection of the second bore recess surface 80 and its own adjacent bore sector surface 76.

Figure 9:
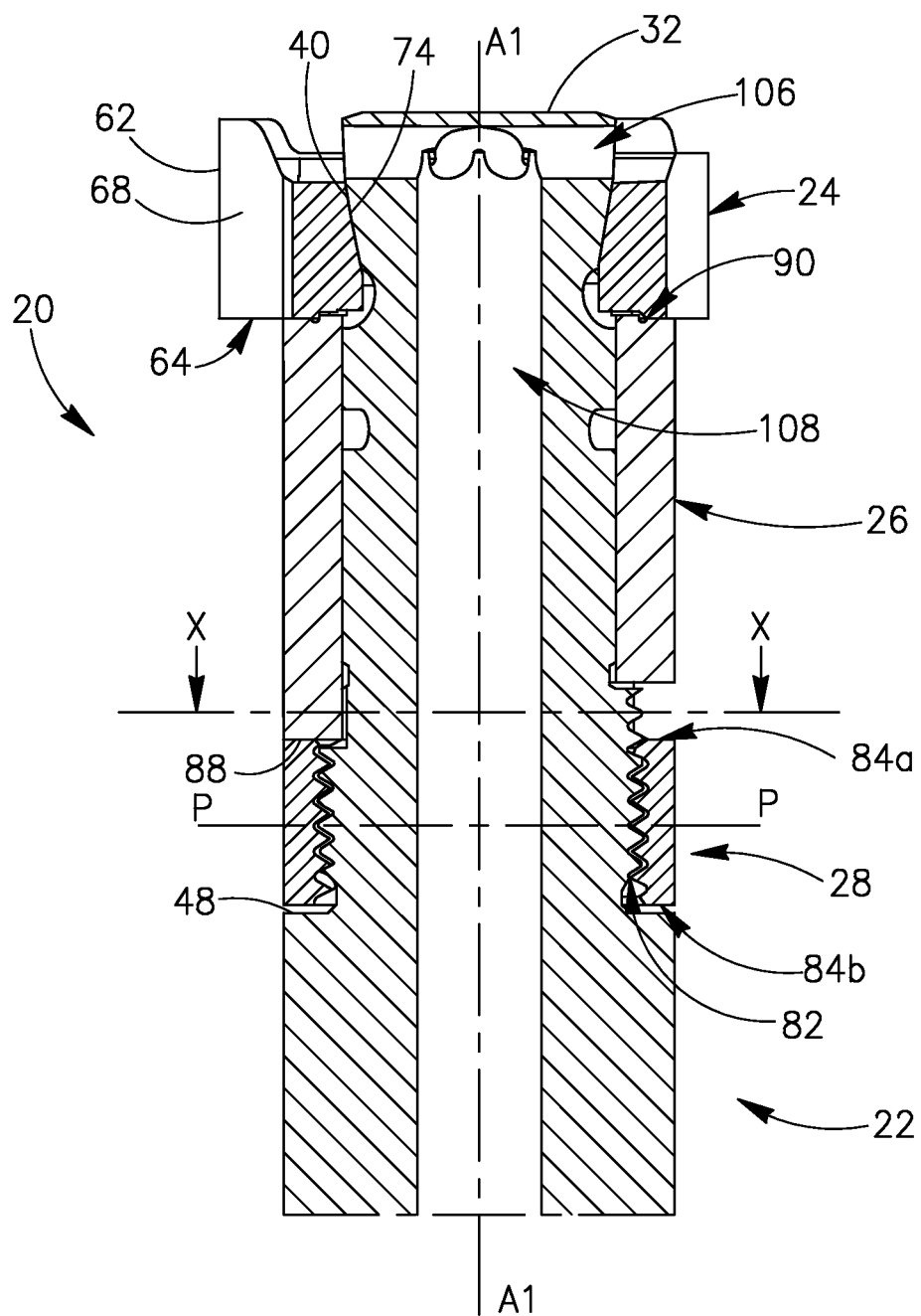
FIG. 9 is a longitudinal cross-sectional side view of the rotary cutting tool shown in FIG. 1.

The clamping nut 28, as shown FIGS. 2 and 9, has a cylindrical shape with a threaded bore 82 between a clamping nut forward end surface 84a and a clamping nut rearward end surface 84b, the clamping nut 28 having mirror symmetry about a central plane P perpendicular to a threaded bore axis A3.

Figure 7:
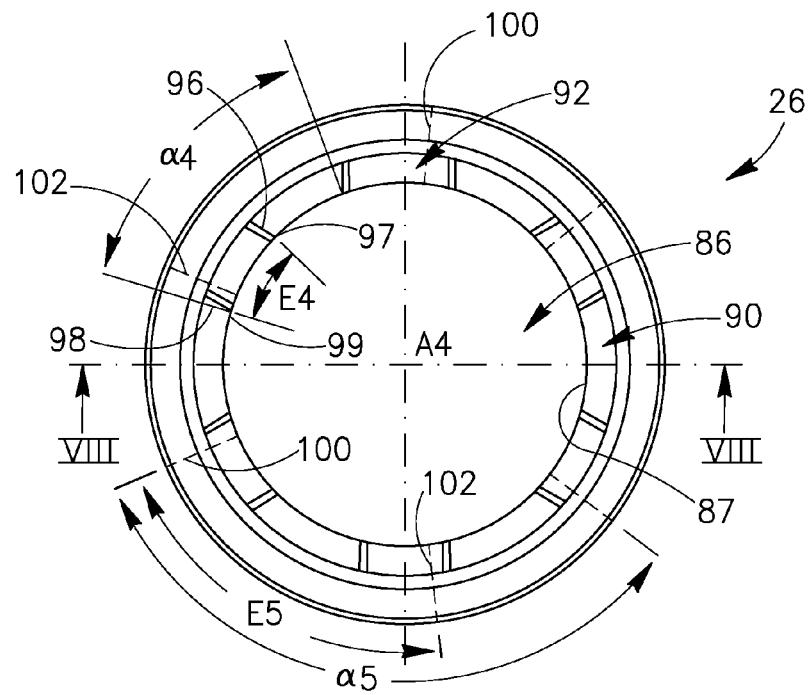
FIG. 7 is a forward end view of a locking sleeve in accordance with the present invention.
Figure 8:
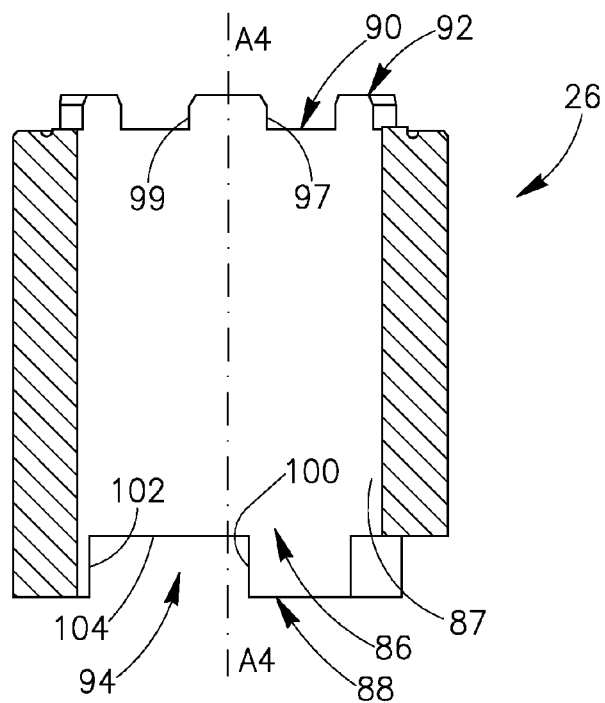
FIG. 8 is a cross-sectional view of the locking sleeve shown in FIG. 7 taken along the line VIII-VIII.

The locking sleeve 26, as shown FIGS. 7 and 8, has a cylindrical shape with a through bore 86 between a locking sleeve rearward end surface 88 and a locking sleeve forward end surface 90. The locking sleeve forward end surface 90 has six circumferentially equally spaced and axially extending alignment protrusions 92 with an alignment protrusion fourth pitch angle α4 equal to the clamping wing first pitch angle α1; 60°, and the locking sleeve rearward end surface 88 has three circumferentially equally spaced and axially extending locking slots 94 with a locking slot fifth pitch angle α5 equal to the locking protrusion second pitch angle α2; 120°.

Each alignment protrusion 92 includes circumferentially delimiting first and second alignment protrusion surfaces 96, 98 transverse to an adjacent through bore surface 87 having an alignment protrusion fourth angular extent E4 between a first alignment protrusion edge 97 and a second alignment protrusion edge 99. The first alignment protrusion edge 97 is formed at the intersection of the first alignment protrusion surface 96 and the through bore surface 87, and the second alignment protrusion edge 99 is formed at the intersection of the second alignment protrusion surface 98 and the through bore surface 87.

Each locking slot 94 includes circumferentially delimiting and radially extending first and second locking slot surfaces 100, 102 having a locking slot fifth angular extent E5. Each locking slot 94 also includes a rearward locking slot surface 104 perpendicular to a through bore axis A4.

Figure 10:
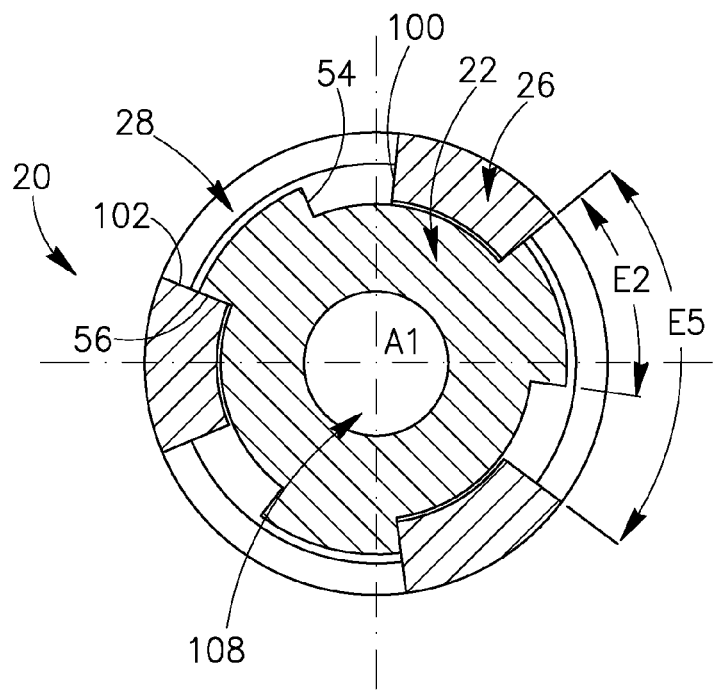
FIG. 10 is a cross-sectional view of the rotary cutting tool shown in FIG. 9 taken along the line X-X.
Figure 11:
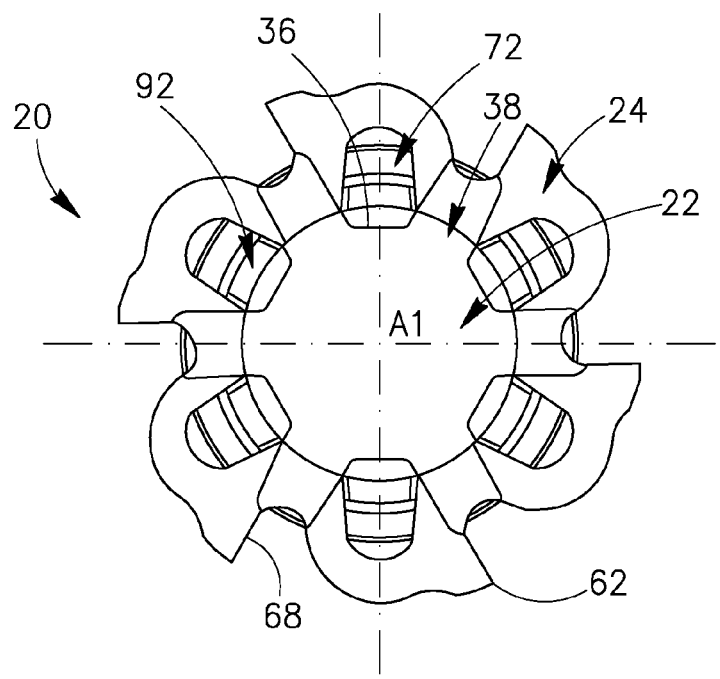
FIG. 11 is a forward end view of the rotary cutting tool shown in FIG. 9.

Attention is now drawn to FIGS. 9 to 11 showing the rotary cutting tool 20, where initial assembly is performed in the following four steps:

In a first assembly step, the clamping nut 28 is positioned adjacent the tool shank forward end surface 32 with the threaded bore axis A3 approximately co-axial with the longitudinal axis A1. Then, the tool shank 22 is inserted into the threaded bore 82 of the clamping nut 28 until the male threaded portion 34 engages the threaded bore 82, and the clamping nut 28 is rotated in a counter-clockwise direction when viewed from the tool shank front surface 32 until the clamping nut rearward end surface 84b is in contact with the annular base surface 48.

In a second assembly step, the locking sleeve rearward end surface 88 is positioned adjacent the tool shank forward end surface 32 with the through bore axis A4 approximately co-axial with the longitudinal axis A1. The tool shank 22 is then inserted into the through bore 86 of the locking sleeve 26 until the three locking protrusions 50 of the tool shank 22 are engaged with the three locking slots 94 of the locking sleeve 26 and each forward locking protrusion surface 52 is in contact with each rearward locking slot surface 104. Then, the locking sleeve 26 is rotated in a counter-clockwise direction when viewed from the tool shank front end surface 32 until the three first locking slot surfaces 100 are in abutment with the three first locking protrusion surfaces 54 and the six alignment protrusions 92 of the locking sleeve 26 are circumferentially aligned with the six clamping wings 38 of the tool shank 22.

In a third assembly step, the cutting head rearward end surface 64 is initially positioned adjacent the tool shank forward end surface 32 with the central bore axis A2 approximately co-axial with the longitudinal axis A1, and the cutting head 24 is rotationally oriented until the six bore recesses 72 are circumferentially aligned with the six clamping wings 38. Then, the tool shank 22 is inserted into the central bore 58 of the cutting head 24 until the six alignment protrusions 92 of the locking sleeve 26 engage with the six bore recesses 72 of the cutting head 24 and the cutting head rearward end surface 64 is in contact with the locking sleeve forward end surface 90, and the six bore sector surfaces 76 of the six bore sectors 70 of the cutting head 24 are rearward of the cutting head receiving portion 30 of the tool shank 22. The locking sleeve 26 and the cutting head 24 are then simultaneously rotated in a clockwise direction when viewed from the tool shank front end surface 32 until the three second locking slot surfaces 102 of the locking sleeve 26 are in abutment with the three second locking protrusion surfaces 56 of the tool shank 22 and the six bore sectors 70 of the cutting head 24 are circumferentially aligned with the six clamping wings 38 of the tool shank 22.

It should be appreciated in the third assembly step that in order to insert the tool shank 22 into the central bore 58 of the cutting head 24 and engage the six alignment protrusions 92 with the six bore recesses 72, the bore recess third angular extent E3 must be greater than the clamping wing first angular extent E1, (E3>E1) and also greater than the alignment protrusion fourth angular extent E4, (E3>E4), and the bore sector third radius R3 must be greater than the receiving surface first radius R1, (R3>R1).

It should also be appreciated during the third assembly step that the extent of angular rotation of the locking sleeve 26 from a position where the three first locking slot surfaces 100 are in abutment with the three first locking protrusion surfaces 54 to a position where the three second locking slot surfaces 102 are in abutment with the three second locking protrusion surfaces 56 is equal to the difference in angular extent between the locking slot fifth angular extent E5 and the locking protrusion second angular extent E2; E5−E2, and the simultaneous rotation of the cutting head 24 from a position where the six bore recesses 72 are circumferentially aligned with the six clamping wings 38 to a position where the six bore sectors 70 are circumferentially aligned with the six clamping wings 38 is equal to half the clamping wing pitch first angle α1; α1/2, where E5−E2 is equal to α1/2 and has a value of 30°.

In a fourth assembly step, the clamping nut 28 is rotated in a clockwise direction when viewed from the tool shank front end surface 32 until the clamping nut forward end surface 84a is in clamping contact with the locking sleeve rearward end surface 88, the locking sleeve forward end surface 90 is in clamping contact with the cutting head rearward end surface 64 and the female clamping surfaces 74 of the six bore sectors 70 are in clamping contact with the male clamping surfaces 40 of the six clamping wings 38. The acute internal first inclination angle δ1 of the male clamping surfaces 40 with the longitudinal axis A1 is equal to the acute external second inclination angle δ2 of the female clamping surfaces 74 with the central bore axis A2, within a manufacturing tolerance of 1°.

It should be appreciated in the fourth assembly step that in order to achieve clamping contact between the female clamping surfaces 74 of the six bore sectors 70 and the male clamping surfaces 40 of the six clamping wings 38, the bore sector third radius R3 must be less than the clamping wing second radius R2, (R3<R2).

The rotary cutting tool 20 of the present invention may have a cutting head 24 constructed such that the cutting diameter D can be adjusted by increasing or decreasing the radial components of the clamping forces between the female clamping surfaces 74 of the six bore sectors 70 and the male clamping surfaces 40 of the six clamping wings 38, and thus may be referred to as an expandable reamer. Rotation of the clamping nut 28 in a clockwise direction when viewed from the tool shank front end surface 32 increases the radial clamping forces and the cutting diameter D, and rotation of the clamping nut 28 in a counter-clockwise direction when viewed from the tool shank front end surface 32 decreases the radial clamping forces and the cutting diameter D.

The rotary cutting tool 20 of the present invention may also be configured for directing coolant fluid to each of the six cutting edges 62 by including six minor diameter coolant bores 106 within the cutting head receiving portion 30 of the tool shank 22, each minor diameter coolant bore 106 radially extending from a major diameter coolant bore 108 co-axial with the longitudinal axis A1 to the outer wing surface 42 of each clamping wing 38.

It should be appreciated that the four assembly steps described above are required for initial assembly of the rotary cutting tool 20 only, where following initial assembly the clamping nut 28 and locking sleeve 26 are not required to be removed when removing and replacing the cutting head 24.

Removal and replacement of the cutting head 24 following normal operation of the rotary cutting tool 20 is performed in the following steps:

In a first cutting head replacement step, the clamping nut 28 is rotated in a counter-clockwise direction when viewed from the tool shank front surface 32 until the clamping nut rearward end surface 84b is in contact with the annular base surface 48.

In a second cutting head replacement step, the locking sleeve 26 and the cutting head 24 are simultaneously rotated in a counter-clockwise direction when viewed from the tool shank front end surface 32 until the three first locking slot surfaces 100 are in abutment with the three first locking protrusion surfaces 54 and the six bore recesses 72 are circumferentially aligned with the six clamping wings 38, after which the cutting head 24 can then be removed.

The third and fourth cutting head replacement steps are a repeat of the third and fourth assembly steps described above for initial assembly of the rotary cutting tool 20.

Although the present invention has been described to a certain degree of particularity, it should be understood that various alterations and modifications could be made without departing from the spirit or scope of the invention as hereinafter claimed.

What is claimed is:

1. A rotary cutting tool (20) comprising a tool shank (22), a cutting head (24), a locking sleeve (26) and a clamping nut (28):

the tool shank (22) comprising a longitudinal axis (A1) extending in a forward to rearward direction (F, R), the tool shank having unitary one-piece construction including a cutting head receiving portion (30) adjacent a tool shank forward end surface (32) and a male threaded portion (34) rearward of the cutting head receiving portion (30), the cutting head receiving portion (30) comprising a plurality of radially protruding and generally axially extending clamping wings (38), each clamping wing

(38) having a male clamping surface (40) outwardly inclined in the forward direction (F);

the cutting head (24) comprising a central bore (58) having a central bore axis (A2) coaxial with the longitudinal axis (A1) and a peripheral outer surface (60) having a plurality of cutting edges (62), with an outer cutting diameter D, axially extending between a cutting head rearward end surface (64) and a cutting head forward end surface (66), the central bore (58) comprising a plurality of generally axially extending bore sectors (70), each bore sector (70) having a female clamping surface (74) outwardly inclined in a direction towards the cutting head forward end surface (66);

the locking sleeve (26) having a cylindrical shape with a through bore (86) between a locking sleeve rearward end surface (88) and a locking sleeve forward end surface (90); and the clamping nut (28) having a threaded bore (82) between a clamping nut forward and rearward end surface (84a, 84b), wherein the threaded bore (82) of the clamping nut (28) is in threaded engagement with the male threaded portion (34) of the tool shank (22), the locking sleeve rearward end surface (88) is in clamping contact with the clamping nut forward end surface (84a), the locking sleeve forward end surface (90) is in clamping contact with the cutting head rearward end surface (64), and the plurality of female clamping surfaces (74) are in clamping contact with the plurality of male clamping surfaces (40), and wherein the clamping contact forces and the cutting diameter D can be increased and decreased by adjusting the rotational position of the clamping nut (28), and the cutting head (24) can be removed and replaced following rotation of the clamping nut (28) without removing either the locking sleeve (26) or the clamping nut (28) from the tool shank (22).

2. The rotary cutting tool (20) according to claim 1, wherein:

the male threaded portion (34) includes a plurality of axially extending locking protrusions (50), the central bore (58) includes a plurality axially extending bore recesses (72), and the locking sleeve forward end surface (90) has a plurality of alignment protrusions (92) and the locking sleeve rearward end surface (88) has a plurality of locking slots (94), and wherein:

the plurality of locking protrusions (50) are engaged with the plurality of locking slots (94), and the plurality of alignment protrusions (92) are engaged with the plurality of bore recesses (72).

3. The rotary cutting tool (20) according to claim 2, wherein the plurality of clamping wings (38), the plurality of bore recesses (72) and the plurality of alignment protrusions (92) are circumferentially equally spaced having a clamping wing first pitch angle α1, a bore recess third pitch angle α3 and an alignment protrusion fourth pitch angle α4, respectively, and wherein the first pitch angle α1, the third pitch angle α3 and the fourth pitch angle α4 are equal.

4. The rotary cutting tool (20) according to claim 3, wherein the plurality of locking protrusions (50) and locking slots (94) are circumferentially equally spaced having a locking protrusion second pitch angle α2 and a locking slot fifth pitch angle α5, respectively, and wherein the second pitch angle α2 and the fifth pitch angle α5 are equal.

5. The rotary cutting tool (20) according to claim 4, comprising six clamping wings (38), six bore recesses (72) and six alignment protrusions (92), having first pitch angles α1, third pitch angles α3 and fourth pitch angles α4, respectively, equal to 60°, and comprising three locking protrusions (50) and three locking slots (94), having second pitch angles α2 and fifth pitch angles α5, respectively, equal to 120°.

6. The rotary cutting tool (20) according to claim 3, wherein:

each of the plurality of locking slots (94) comprises circumferentially delimiting and radially extending first and second locking slot surfaces (100, 102) having a locking slot fifth angular extent E5, and each of the plurality of locking protrusions (50) comprises circumferentially delimiting and radially extending first and second locking protrusion surfaces (54, 56) having a locking protrusion second angular extent E2, and wherein:

the fifth angular extent E5 is greater than the second angular extent E2, and the difference in angular extent between the second angular extent E2 and the fifth angular extent E5; E5-E2 is equal to half of the first pitch angle α1; α1/2.

7. The rotary cutting tool (20) according to claim 2, wherein:

each of the plurality of clamping wings (38) includes a partially cylindrical extending outer wing surface (42) adjacent the tool shank forward end surface (32) having a clamping wing second radius R2, and each of the plurality of bore sectors (70) includes an axially extending bore sector surface (76) adjacent the cutting head rearward end surface (64) having a bore sector third radius R3, and wherein the second radius R2 is greater than the third radius R3.

8. The rotary cutting tool (20) according to claim 7, wherein:

the cutting head receiving portion (30) has a plurality of generally planar cutting head receiving surfaces (36) circumferentially equally spaced about the longitudinal axis (A1) alternating with the plurality of clamping wings (38), and an imaginary circle (C) circumscribed through lines of intersection between the plurality of cutting head receiving surfaces (36) and the plurality of clamping wings (38) has a receiving surface first radius R1, and wherein the third radius R3 is greater than the first radius R1.

9. The rotary cutting tool (20) according to claim 7, wherein:

each of the plurality of bore recesses (72) comprises circumferentially delimiting first and second bore recess surfaces (78, 80) transverse to the adjacent bore sector surface (76) having a bore recess third angular extent E3, each of the plurality of clamping wings (38) comprises circumferentially delimiting leading and trailing wing surfaces (44, 46) transverse to the adjacent outer wing surface (42) having a clamping wing first angular extent E1, and each of the plurality of alignment protrusions (92) comprises circumferentially delimiting first and second alignment protrusion surfaces (96, 98) transverse to the adjacent through bore surface (86) having an alignment protrusion fourth angular extent E4, and wherein the third angular extent E3 is greater than the first angular extent E1, and the third angular extent E3 is greater than the fourth angular extent E4.

10. The rotary cutting tool (20) according to claim 7, wherein a minor diameter coolant bore (106) radially extends from a major diameter coolant bore (108) co-axial with the longitudinal axis (A1) to the outer wing surface (42) of each clamping wing (38).

11. A method of assembling the rotary cutting tool (20) of claim 2, comprising:
positioning the threaded bore (82) of the clamping nut (28) approximately co-axially with the longitudinal axis (A1) before engaging the male threaded portion (34) of the tool shank (22) with the threaded bore (82) and rotating the clamping nut (28) in a counter-clockwise direction when viewed from the tool shank front end surface (32),
positioning the through bore (86) of the locking sleeve (26) co-axially with the longitudinal axis (A1) before engaging the plurality of locking protrusions (50) with the plurality of locking slots (94) and rotating the locking sleeve (26) in a counter-clockwise direction when viewed from the tool shank front end surface (32) until the plurality of alignment protrusions (92) are circumferentially aligned with the plurality of clamping wings (38),
positioning the central bore (58) of the cutting head (24) co-axially with the longitudinal axis (A1) before engaging the plurality of bore recesses (72) with the plurality of clamping wings (38) and the plurality of alignment protrusions (92), and rotating the cutting head (24) in a clockwise direction when viewed from the tool shank front end surface (32) until the plurality of bore sectors (70) are aligned with the plurality of clamping wings (38),
and
rotating the clamping nut (28) in a clockwise direction when viewed from the tool shank front end surface (32) until clamping contact is made between:
the clamping nut forward end surface (84a) and the locking sleeve rearward end surface (88),
the locking sleeve forward end surface (90) and the cutting head rearward end surface (64), and
the plurality of female clamping surfaces (74) and the plurality of male clamping surfaces (40).

12. The rotary cutting tool (20) according to claim 1, wherein an acute internal first inclination angle δ1 formed between the plurality of male clamping surfaces (40) and the longitudinal axis (A1) is substantially equal to an acute external second inclination angle δ2 formed between the plurality of female clamping surfaces (74) and the central bore axis (A2).

13. The rotary cutting tool (20) according to claim 1, wherein the rotary cutting tool (20) is an expandable reamer.

14. The rotary cutting tool (20) according to claim 1 wherein the cutting head (24) is manufactured from cemented carbide.

15. A rotary cutting tool (20) comprising:
a tool shank (22) having a longitudinal axis (A1) extending in a forward to rearward direction (F, R), the tool shank having unitary one-piece construction including a cutting head receiving portion (30) adjacent a tool shank forward end surface (32) and a male threaded portion (34) rearward of the cutting head receiving portion (30), the cutting head receiving portion (30) comprising a plurality of radially protruding and generally axially extending clamping wings (38), each clamping wing (38) having a male clamping surface (40) outwardly inclined in the forward direction (F);
a cutting head (24) extending between a cutting head rearward end surface (64) and a cutting head forward end surface (66), the cutting head comprising a peripheral outer surface (60) having a plurality of cutting edges (62) defining an outer cutting diameter D, and a central bore (58) having a central bore axis (A2) and comprising a plurality of generally axially extending bore sectors (70), each bore sector (70) having a female clamping surface (74) outwardly inclined in a direction towards the cutting head forward end surface (66);
a locking sleeve (26) having a cylindrical shape and a through bore (86) extending between a locking sleeve rearward end surface (88) and a locking sleeve forward end surface (90); and
a clamping nut (28) having a threaded bore (82) extending between a clamping nut forward surface (84a) and clamping nut rearward end surface (84b);
wherein:
the clamping nut's threaded bore (82) is in threaded engagement with the tool shank's male threaded portion (34);
the locking sleeve's rearward end surface (88) is in clamping contact with the clamping nut's forward end surface (84a);
the locking sleeve's forward end surface (90) is in clamping contact with the cutting head's rearward end surface (64); and
the cutting head's female clamping surfaces (74) are in clamping contact with the tool shank's male clamping surfaces (40).

16. The rotary cutting tool (20) according to claim 15, configured such that:
adjusting a rotational position of the clamping nut (28) adjusts the cutting diameter D; and
following rotation of the clamping nut (28) in the rearward direction (R), the cutting head (24) can be replaced without removing either the locking sleeve (26) or the clamping nut (28) from the tool shank (22).

* * * * *